United States Patent Office.

THOMAS S. HARRISON AND CONRAD SEMPER, OF PHILADELPHIA, PENNSYLVANIA.

ALUMINOUS COMPOUND.

SPECIFICATION forming part of Letters Patent No. 497,570, dated May 16, 1893.

Application filed May 24, 1888. Serial No. 274,991. (No specimens.)

*To all whom it may concern:*

Be it known that we, THOMAS S. HARRISON and CONRAD SEMPER, both of Philadelphia, in the State of Pennsylvania, have invented a certain new and useful Improvement in Aluminous Compounds, whereof the following is a specification.

As now usually made, soda alum is of such a mushy consistency that it is ill adapted for grinding, and requires special means for packing and transportation. If it is attempted to concentrate the aluminous solution sufficiently to yield a hard product, the loss for commercial purposes is very considerable, both in the length of time that is required, and in the diminution of weight of the product.

Our invention consists in a sulphate of alumina so combined with a percentage of double sulphate of alumina and soda, as to form an aluminous cake free from insoluble grit, capable of being ground, and yet more soluble than an equally hard crystal alum, or sulphate of alumina made by any of the ordinary processes could be. We obtain this product by adding to an aluminous solution at a certain stage of the manufacture, a material which by analogy may be termed a "drier," whose effect is to rapidly stiffen or harden the solution, and to yield a hard product, the drying material in no way impairing the commercial value thereof.

We take an aluminous solution derived from any source, pure or impure, and concentrate it in the usual manner by boiling, until it has reached the point at which it is ordinarily withdrawn and allowed to harden. We then add (preferably just before running it off), sulphate of soda in the form of a powder, and in quantities which may vary with the strength of the aluminous solution, or with the character which is desired for the ultimate product. We have obtained good results by adding to a solution of sulphate of alumina 55° Baumé, twenty per cent. of dry sulphate of soda, but we of course do not confine ourselves to such particular percentage. The sulphate of soda may be crude salt-cake or niter cake, preferably anhydrous, and also preferably containing no chlorine or nitric acid. Upon adding the powdered sulphate of soda, we stir briskly, so as to thoroughly distribute it throughout the concentrated solution, and then rapidly run off onto a suitable cooling floor. The resultant product is sulphate of alumina, mechanically combined with a certain percentage of double sulphate of alumina and soda, and forms, instead of a soft or mushy mass, a hard, dry mixture which can be readily ground, but which is highly soluble.

We are aware that the manufacture of soda alum in crystalline form has been suggested by the addition of hot and concentrated solutions of soda alum to colder and weaker solutions thereof for the purpose of preventing solidification without crystallization. This last mentioned process, however, has no analogy to our method of manufacture since it lacks the essential element of our invention, viz: the addition of the sulphate of soda at a definite time to the already concentrated aluminous solution, for the purpose and with the effect of speedily solidifying the same without crystallization. The product, moreover, of said process is stated to be in separate crystals while ours is a homogeneous and soluble cake.

We do not claim broadly an alum containing sulphate of soda, but our invention consists in a product in which the results above described, have been developed by the specified treatment.

We therefore claim—

The hereinbefore described compound of sulphate of alumina and double sulphate of alumina and soda hardened together substantially as set forth.

THOMAS S. HARRISON.
CONRAD SEMPER.

Witnesses:
WM. C. WILSON,
D. C. LLOYD.